3,372,274
INERT RADIOACTIVE FISSION GAS SAMPLER
Robert R. Landolt, West Lafayette, Ind., assignor to the United States of America as represented by the United States Atomic Energy Commission
Filed Jan. 26, 1966, Ser. No. 523,513
3 Claims. (Cl. 250—83)

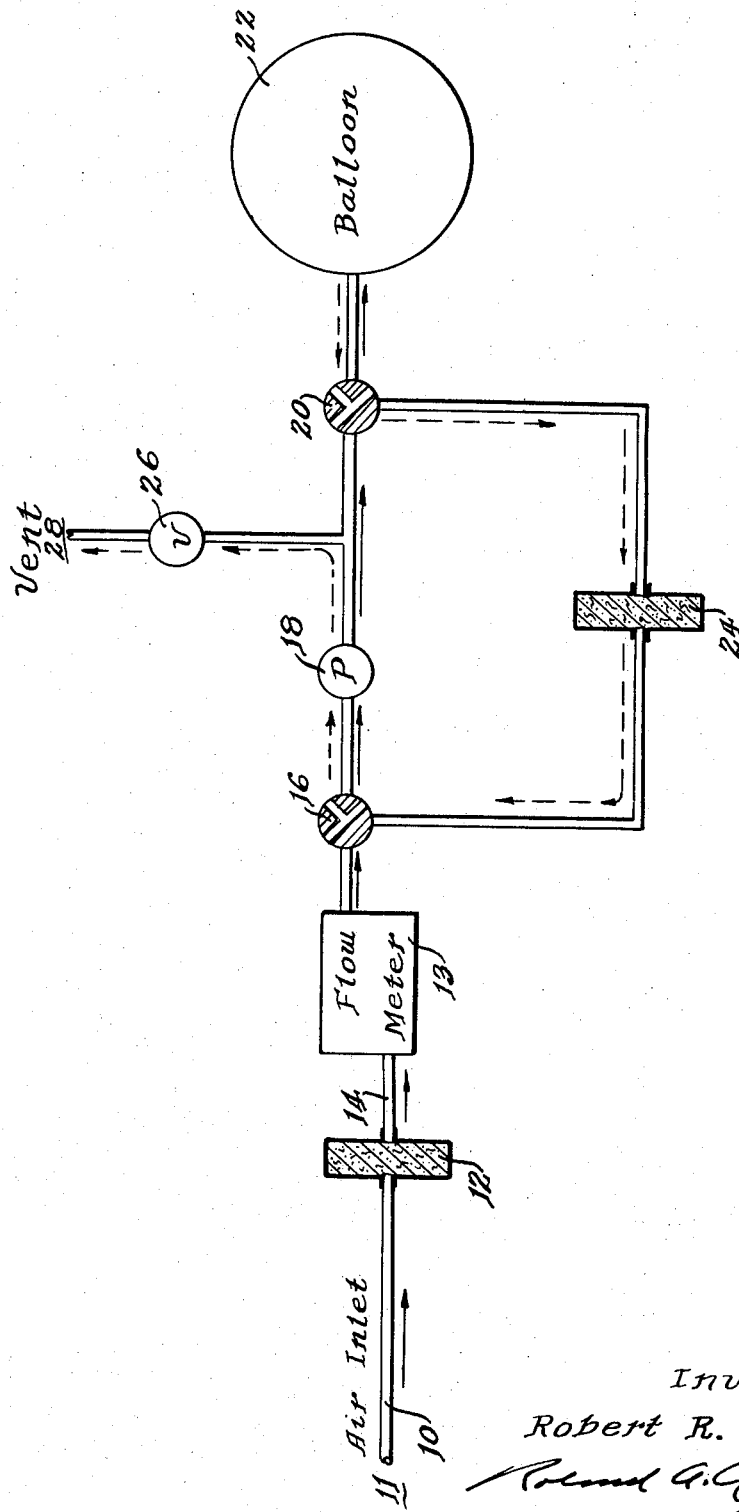

The invention described herein was made in the course of, or under, a contract with the United States Atomic Energy Commission.

This invention relates to a method of measuring the radioactivity of an inert fission gas; more particularly the invention relates to measuring the radioactivity of inert fission gases having particulate daughter products. The method may be used, for instance, to determine the radioactive noble gas concentration in a cloud resulting from the destructive test of a nuclear reactor such as the SNAPTRAN destructive test described in AEC Research and Development Report IDO-17038 (available from the Clearinghouse for Federal Scientific and Technical Information, National Bureau of Standards, U.S. Department of Commerce, Springfield, Va.).

During the neutron bombardment of uranium or plutonium, radioactive fission products are formed; among them are noble gases, such as krypton and xenon. These radioactive gases escape into the atmosphere when the reactor is destroyed due to the heat generated from an uncontrolled reactivity level as might be permitted during a destructive test of a reactor. It is then necessary to determine the concentration of the radioactive gases in the cloud formed during the destruction of the reactor in order to predict atmospheric contamination if such a reactor were destroyed by accident while in commercial operation.

The detection and measurement of gases such as krypton and xenon is difficult because under most conditions they are chemically inert and therefore difficult to sample by chemical methods. Further, since they are gases, it is difficult to collect them by commonly used filtering media. However, the radioactive noble gases, such as those formed as fission products, decay by beta-emission to form radioactive, beta-emitting alkali metal daughter products. For instance, $Kr^{89}$ decays to $Rb^{89}$, $Kr^{91}$ to $Rb^{91}$, $Xe^{138}$ to $Cs^{138}$; that is, krypton decays to its corresponding rubidium isotope and xenon decays to its corresponding cesium isotope. These daughter products are particulate in nature. Another problem encountered in measuring the quantity of radioactive krypton and xenon is the prevention of plate out on the walls and surfaces of the sampling containers by their particulate daughter products. This reduces the accuracy of the measurement.

Another factor in getting an accurate quantitative measure of radioactivity in a gas is the volume of the gas. The number of photons incident upon the measuring apparatus is of course, dependent upon the volume of the source. Consequently, the smaller is the source volume, the greater is the overall efficiency of measurement.

It is an object of this invention to provide a novel method for measuring the radioactivity of an inert fission gas in a given sample of an unknown mixture.

It is another object of this invention to provide a method for measuring the radioactivity of an inert fission gas wherein the measuring apparatus has substantially all of the radioactive material in question within its view thereby increasing the number of photons incident on the apparatus and increasing the overall efficiency of the measurement.

It is still another object of this invention to provide a method for measuring the radioactivity of an inert fission gas wherein substantial quantities of a mixture can be sampled without affecting the accuracy of the measurement.

It is yet another object of this invention to provide a method for measuring the radioactivity of an inert fission gas wherein the amounts of the daughter product which plate out on the sampling container are included in the measurement.

It is an even further object of this invention to provide a method for measuring the radioactivity of an inert fission gas in a sample wherein the radioactivity measurements may be made with a commercially available radiation detector.

The above objects of the invention are accomplished by removing all particulate matter from a measured sample of the suspect mixture, storing the sample in an airtight, resiliently-expandable container for a predetermined time, collecting the particulate daughters formed by the decay events in the container by exhausting its contents through a clean filter, and then measuring the radioactivity of the combination of the filter and the collapsed container. This measurement allows one to determine the quantity of inert radioactive fission gas in the sample by a back calculation using the radioactivity decay characteristics of the parent fission gas.

While the method of this invention can be carried out in different types of apparatus, the attached drawing shows a schematic block diagram of apparatus successfully used for the practice of the method of the present invention.

Referring to the drawing, the solid arrows indicate the direction of gas flow during the intake or sampling cycle. An inlet pipe 10 has one end adapted to receive air during the intake cycle from the cloud of gas as indicated by reference numeral 11. The other end of the inlet pipe 10 is connected to a high efficiency filter 12 which is coupled to a flow meter 13 via conduit 14. The filter 12, in this apparatus, accomplishes the step of pre-filtering the sample to remove all particulate material and halogens therefrom. This is necessary because any radioactive particulate daughter product that passes into the storage chamber would then distort the final reading of radioactivity by adding the amount present at the outset of the process.

A first two-way, solenoid-controlled valve 16 is adapted to direct the sample of gas flowing from flow meter 13 into a pump 18 during the intake cycle. A second two-way, solenoid-controlled valve 20 is positioned to channel gas flowing through pump 18 into a balloon 22 or similar airtight, resiliently-expandable container. As mentioned above, the sample of gas is stored in balloon 2 for a predetermined time before it is exhausted. I have determined that a storage time of approximately five half-lives of the parent fission gas is well-suited to carrying out the present method.

The flow of the sample during the exhaust cycle is indicated by the dashed arrows of the drawing. During exhaust, valve 16 and valve 20 are positioned to force the sample through a by-pass or collecting filter 24 for trapping the particulate daughter products formed by decay of the radioactive inert fission gas while stored in balloon 22. The sample then passes through the pump 18 again and back into the atmosphere, as indicated by numeral 28, through a solenoid-controlled valve 26 in the direction of the dashed arrow.

The collecting filter 24 and the balloon 22, which is now in a collapsed state, are situated (either by removal from the apparatus or by virtue of being located in proximity to each other within the apparatus) to be jointly measured for radioactivity. Any daughter product particles that may have plated out on the balloon 22 or have been trapped in collecting filter 24, are then detected in a single measurement by any commercially available radiation monitor. An important advantage of the present invention is the fact that by storing the sample of gas during the time allowed for decay in an airtight, resiliently-expandable container, a single measurement (and one of greater accuracy for reasons mentioned above) will determine the sum of particulate matter which has plated out on the container during storage and which has been trapped by the collecting filter 24.

It will be noted that this method readily lends itself to the detection of very low concentrations of inert fission gases since the same intake and exhaust cycles could be repeated a number of times with the same apparatus before measuring the contents of the collecting filter and collapsed container with a radiation monitor, thereby sampling a relatively large volume of gas and getting a high degree of condensation before attempting to detect the pressure of the daughter products.

A sample calculation will now be illustrated indicating the use of the present method. By measuring the amount of daughter activity collected after the storage time (which, in our case, is approximately five half-lives of the parent fission gas, as mentioned above), one can determine directly from this reading the number of atoms of the daughter which were present at the time the sample was exhausted from the balloon 22. The number of daughter product atoms is indicated by $N_b$. Then knowing the decay constant of the daughter $\lambda_b$, the decay constant of the parent fission gas, $\lambda_a$, and the storage time, $t$, in which the sample was allowed to remain in the airtight container, one makes a back-calculation to find the number of atoms of the parent gas ($N_{ao}$) that were present at the time of gas intake. The following equation, which is derived from the radioactive decay characteristics of the parent fission gas, is used:

$$N_{ao} = \frac{N_b(\lambda_b - \lambda_a)}{(e^{-\lambda_a t} - e^{-\lambda_b t})\lambda_a} \quad (1)$$

Once the number of atoms of the parent fission gas at intake time is determined, one can calculate the concentration of the fission gas in the intake sample, $C_s$, from the equation:

$$C_s = \frac{N_{ao}}{V_s} \quad (2)$$

where $V_s$ equals the volume of air drawn into the balloon as measured by flow meter 14 of the apparatus in the drawing.

The total quantity of fission gas in the cloud is determined by multiplying the concentration of inert fission gas in the sample (from Equation 2) by the estimated volume of the cloud from which it was taken.

A sample calculation is as follows. For an intake sampling time of 10 seconds, and a sampling rate of 1.0 cubic feet per minute from a cloud estimated to be $1.46 \times 10^6$ cubic feet, the volume of the sample will be 0.166 cubic feet. Then, if the number of daughter atoms, $N_b$, as determined from the radiation count at the end of the storage time, $t$ (which is 88 minutes, or approximately five half-lives of xenon-138, in this example) is $1.9 \times 10^7$, and the daughter is cesium-138 (which has a decay constant of 0.0408 min.$^{-1}$), from Equation 1, $N_{ao}$ is calculated to be $1.37 \times 10^8$ atoms of xenon-138 (which has a decay constant of 0.0216 min.$^{-1}$). From this, the concentration of the parent fission gas in the sample is $8.25 \times 10^8$ atoms per cubic foot. The total number of atoms of the parent fission gas in the whole cloud is then $1.2 \times 10^{15}$.

The embodiments of the invention in which an exclusive property or privilege is claimed are defined as follows:

1. The method of measuring the radioactivity of an inert fission gas in a sample of a mixture of gases, comprising the steps:

removing all particulate matter from said sample, thereby obtaining a purified sample;

storing the purified sample in an airtight resiliently-expandable container for a predetermined time;

exhausting the contents of said collapsible container through a collecting means whereby particulate daughter products resulting from decay events occurring within said container are collected therein; and measuring the radioactivity of the collecting means and the collapsed container to determine the amount of the particulate daughter present in the exhaust mixture;

whereby the quantity of radioactive inert fission gas present in the sample can be determined by the radioactivity decay characteristics of the inert fission gas.

2. The method of claim 1 wherein said step of removing particulate matter from the sample comprises forcing said sample through a filtering means.

3. The method of claim 2 wherein said step of storing comprises storing the purified sample in a balloon for a period approximately five half-lives of the parent fission gas.

References Cited

UNITED STATES PATENTS

| | | | |
|---|---|---|---|
| 3,084,215 | 4/1963 | Goupil | 250—83.3 |
| 3,085,439 | 4/1963 | Price | 73—421.5 |
| 3,089,032 | 5/1963 | Gouplil et al. | 250—83.6 X |
| 3,200,041 | 8/1965 | Ralfe et al. | 250—83 X |
| 3,339,070 | 8/1967 | Main | 250—83.6 X |

RALPH G. NILSON, *Primary Examiner.*

S. ELBAUM, *Assistant Examiner.*